Oct. 23, 1928. F. H. CHANDLER Re. 17,114

TOASTING OR COOKING APPARATUS

2 Sheets-Sheet 1

Original Filed May 24, 1926

Inventor
FRANK H. CHANDLER

By Ch. Darlen
Attorney

Oct. 23, 1928. F. H. CHANDLER Re. 17,114

TOASTING OR COOKING APPARATUS

2 Sheets-Sheet 2

Original Filed May 24, 1926

Inventor
FRANK H. CHANDLER

By Ch. Darlen

Attorney

Reissued Oct. 23, 1928. Re. 17,114

UNITED STATES PATENT OFFICE.

FRANK H. CHANDLER, OF DANVILLE, ILLINOIS, ASSIGNOR TO C. V. CHAMPION & COMPANY, OF DANVILLE, ILLINOIS, A CORPORATION OF ILLINOIS.

TOASTING OR COOKING APPARATUS.

Original No. 1,609,694, dated December 7, 1926, Serial No. 111,439, filed May 24, 1926. Application for reissue filed August 29, 1927. Serial No. 216,322.

This invention relates to toasting or cooking apparatus and is an improvement over the construction described and claimed in my copending application filed May 15, 1925, Serial No. 30,574.

In the said application I have described and claimed a cooking apparatus consisting of upper and lower plates having means for adjusting the distance between the plates whereby articles of different sizes or thickness may be cooked on both sides simultaneously, the upper plate being hinged to permit it to be moved to an inoperative position when placing articles on the apparatus or removing them therefrom.

An object of the present invention is to provide improved means for adjusting the distance between the two plates.

More specifically I provide a frame or base on which the lower plate is mounted having vertically movable supporting members on which the upper plate is mounted and to which it is hinged.

Figure 1:
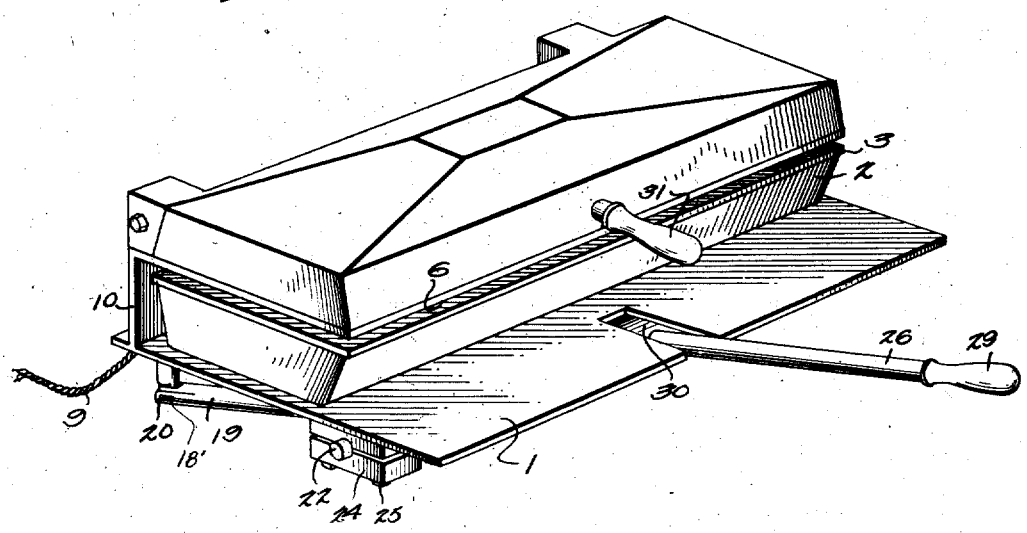
Figure 2:
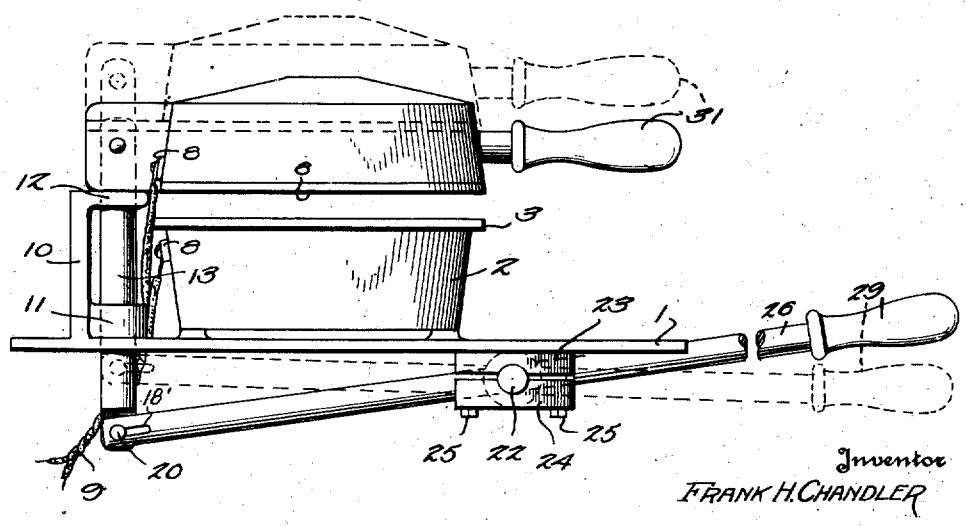
Figure 3:
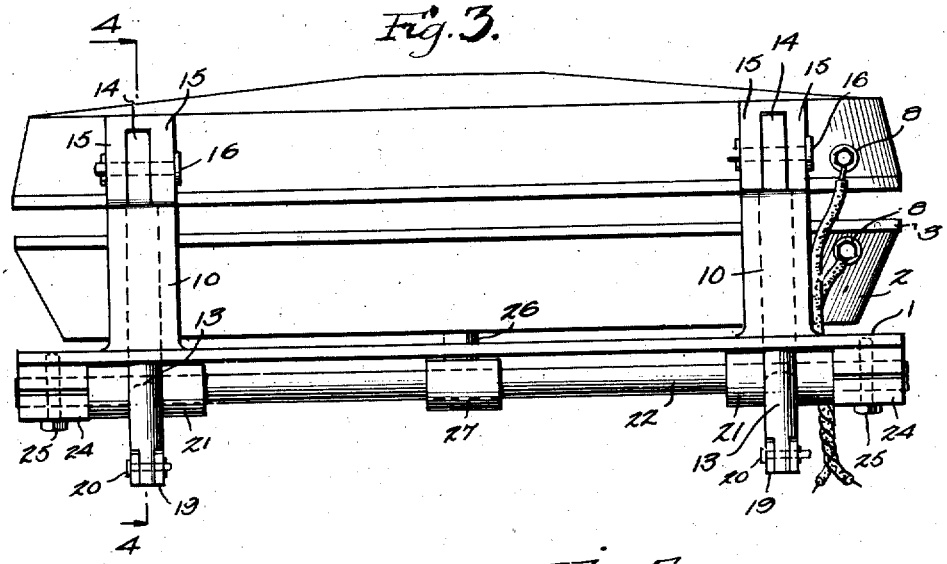
Figure 5:
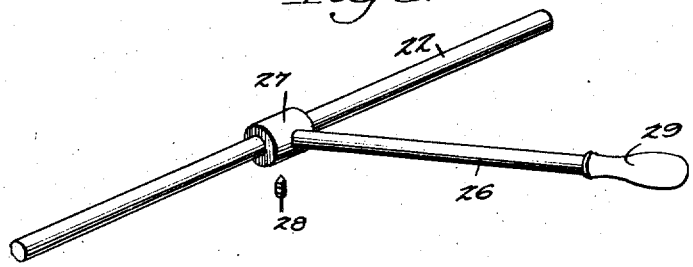

In the accompanying drawings I have shown one embodiment of the invention. In this showing, Figure 1 is a perspective view, Figure 2 is a side elevation, the raised position of the upper plate being indicated in dotted lines, Figure 3 is a rear elevation, Figure 4 is a vertical sectional view on line 4—4 of Figure 3 showing the upper plate swung upwardly on its hinges, and Figure 5 is a perspective view of an operating handle and shaft.

Referring to the drawings, the reference numeral 1 designates a suitable base or support adapted to receive a housing or casing 2. The lower cooking plate 3 is arranged on this housing and suitable heating elements 4 are arranged within the housing immediately adjacent this plate (see Figure 4). I further provide an upper housing 5 having an upper cooking plate 6 adapted to be arranged over the lower cooking plate as shown in Figures 1, 2 and 3, and spaced therefrom a desired distance depending upon the article to be cooked or toasted. Adjacent the cooking plate and within the housing I provide suitable heating elements 7. As shown, the heating elements 4 and 7 are connected to binding posts or terminals 8 arranged on the back of the housings and adapted to be connected to suitable lead wires 9.

Figure 4:
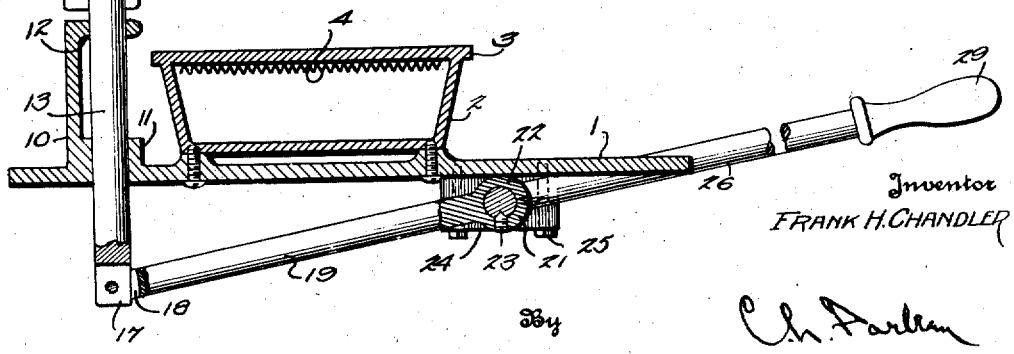

The upper cooking plate is capable of vertical adjustment with respect to the lower cooking plate and is also hingedly mounted to permit it to be swung to the position shown in Figure 4 of the drawings for the purpose of placing articles of food in the apparatus or removing them therefrom. As shown, guide bearings 10 are arranged at the back of the base adjacent each side and these bearings are provided with sleeves 11 and 12 which receive vertical supporting members or rods 13. The upper ends of these rods are reduced in thickness as at 14 and are adapted to be received between a pair of ears 15 formed on the rear edge of the upper housing. Suitable pivot pins 16 are passed through alined openings in the rods and the ears. The lower ends of the rods are also reduced in cross section as at 17 and are adapted to be received in the forked ends 18 of arms 19. The supporting rods and the arms are pivotally connected to each other by means of pins 20. The forked ends 18 of the arms 19 are provided with the slots 18′ to permit the pins 20 to slide therein to prevent binding of the parts when the arms 19 are actuated. The forward ends of the arms are provided with sleeves 21 adapted to receive an operating or adjusting shaft 22. As shown, the sleeves are secured to the shaft by means of set screws 23 to cause them to revolve therewith. This shaft is mounted in bearings arranged at opposite sides of the base and consisting of upper sections 23 and lower sections 24 secured to each other by means of bolts 25. This permits the bearing to be adjusted to engage the shaft with sufficient friction to retain the apparatus in an adjusted position and prevent the weight of the housing or casing 5 from lowering the rods. An operating lever 26 is connected to the shaft 22. As shown, this lever is provided with a sleeve 27 on its inner end adapted to surround the shaft and is secured thereto by means of a set screw 28. A suitable handle 29 is arranged on the outer end of the lever. The front edge of the base may be provided with a slot 30 to permit passage of this lever when in an inclined position. The upper housing may also be provided with a handle 31 to be grasped by the operator when it is to be swung to the raised position shown in Figure 4 of the drawings.

The operation of the device will be apparent from the foregoing description. While the apparatus may be used for any type of cooking or toasting it is particularly adapted for toasting sandwiches and the like. When toasting slices of bread or other thin articles of food the plates are arranged adjacent each other as shown in full lines in Figure 2 of the drawings. When toasting a prepared sandwich or other food article of appreciable thickness the distance between the plates is adjusted so that the plates will contact with the upper and lower surfaces of the article to be toasted or cooked thus permitting the two sides to be toasted or cooked at the same time. To move the upper cooking plate away from the lower cooking plate the operating lever 26 is swung downwardly to the dotted line position shown in Figure 2 of the drawings causing the shaft to move in a counter clockwise direction and swing the rear ends of the arms 19 upwardly thus raising the supporting rods 13 and the upper cooking plate to the dotted line position. By having the bearings of the shaft 22 sufficiently tight the apparatus may be adjusted to any desired intermediate position and the friction of the bearings on the shaft will retain the apparatus in such position overcoming the weight of the upper housing. When placing articles of food on the apparatus or removing them the upper housing may be swung to the position shown in Figure 4 of the drawings by grasping the handle 31 and moving it upwardly.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. In a device of the character described, a lower cooking plate, movable supporting means, a lever arm for vertically adjusting said supporting means, and an upper cooking plate carried by said supporting means.

2. In a device of the character described, a lower cooking plate, vertically movable supporting members, and an upper cooking plate hingedly mounted on said supporting members.

3. In a device of the character described, a lower cooking plate, a plurality of guide bearings, vertically movable supporting rods mounted in said guide bearings, means for actuating said rods, and an upper cooking plate carried by said supporting rods.

4. In a device of the character described, a lower cooking plate, a plurality of guide bearings, vertically movable supporting rods mounted in said guide bearings, and an upper cooking plate hingedly mounted on said rods.

5. In a device of the character described, a lower cooking plate, a pair of vertically movable supporting rods, an upper cooking plate carried by said rods, arms connected to the lower ends of said rods, and means for actuating said arms to adjust said rods and said upper cooking plate.

6. In a device of the character described, a lower cooking plate, a pair of vertically movable supporting rods, an upper cooking plate carried by said rods, arms connected to the lower ends of said rods, a shaft to which said arms are connected, and means for oscillating said shaft.

7. A device of the character described comprising a support, a lower cooking plate mounted on said support, guide bearings carried by said support, vertically movable supporting rods slidably mounted in said bearings, an upper cooking plate carried by said rods, and means for actuating said rods.

8. A device of the character described comprising a pair of upper and lower cooking plates, means for supporting said plates for and during relative bodily vertical movement directly toward and away from each other, and actuating means for effecting such movement, one of said plates being mounted to swing toward and away from the other plate.

9. A device of the character described comprising a pair of upper and lower cooking plates, means for supporting said plates for wholly unrestricted relative bodily vertical movement directly toward and away from each other and for supporting said plates during such movement, and actuating means for effecting such movement, one of said plates being mounted to swing toward and away from the other plate independently of said bodily movement.

10. A device of the character described comprising a pair of upper and lower cooking plates, means for supporting said plates for wholly unrestricted relative bodily vertical movement directly toward and away from each other and for supporting said plates during such movement, said plates being adapted for gravitational movement toward each other, and movable actuating means for effecting movement of said plates away from each other, one of said plates being mounted to swing toward and away from the other plate independently of said bodily movement.

11. A device of the character described comprising a pair of cooking plates normally arranged in spaced super-imposed position, one of said plates being fixed against bodily vertical movement, means for supporting the other plate for and during vertical movement directly toward and away from said first named plate, and actuating means for effecting the movement of said supporting means to provide vertical adjustment of said first named plate, one of said plates being pivotally supported to permit it to swing toward and away from the other plate.

12. A device of the character described comprising a pair of cooking plates normally arranged in spaced super-imposed relation, one of said plates being fixed against bodily vertical movement, means for supporting the other plate for and during wholly unrestricted bodily vertical movement directly toward and away from said first named plate, and means operatively connected with said last named plate for effecting vertical movement thereof, one of said plates being pivotally supported to permit it to swing toward and away from the plate independently of said bodily movement.

13. A device of the character described comprising a fixed lower cooking plate, an upper cooking plate normally parallel thereto and spaced therefrom, means for supporting said upper plate for wholly unrestricted bodily vertical movement whereby it is adapted to move downwardly by gravity and for supporting said upper plate during such movement, and means operatively connected with said upper plate for effecting the upward vertical movement thereof, one of said plates being mounted to swing toward and away from the other of said plates.

14. A device of the character described comprising a fixed lower cooking plate, an upper cooking plate normally parallel thereto and spaced therefrom, means for supporting said upper cooking plate for wholly unrestricted bodily vertical movement whereby it is adapted to move downwardly by gravity and for supporting said upper plate during such movement, and pivot means connected between said last named means and said upper plate for permitting the latter to swing toward and away from said lower plate.

15. A device of the character described comprising a pair of upper and lower cooking plates, movable supporting means for one of said plates, means for effecting the vertical movement of said supporting means, and pivot means connected with one of said plates for permitting such plate to swing toward and away from the other of said plates.

16. A device of the character described comprising a pair of upper and lower cooking plates, movable supporting means for one of said plates and pivotally connected thereto whereby such plate is adapted to swing away from the other of said plates, and movable actuating means operatively connected with said supporting means for effecting wholly unrestricted bodily vertical movement thereof.

17. A device of the character described comprising a pair of upper and lower cooking plates, movable supporting means for one of said plates, and movable actuating means operatively connected with said supporting means for effecting the vertical movement thereof, one of said plates being mounted to swing toward and away from the other plate.

18. A device of the character described comprising upper and lower cooking plates, a fixed support for one of said plates and pivotally connected thereto whereby such plate is adapted to swing away from the other of said plates, movable supporting means for the other of said plates, and actuating means carried by said fixed support for effecting the movement of said movable supporting means.

In testimony whereof, I affix my signature

FRANK H. CHANDLER.